No. 696,017. Patented Mar. 25, 1902.
E. F. DUTTON.
CONTROLLER FOR ELECTRIC MOTORS.
(Application filed Aug. 9, 1901.)
(No Model.)
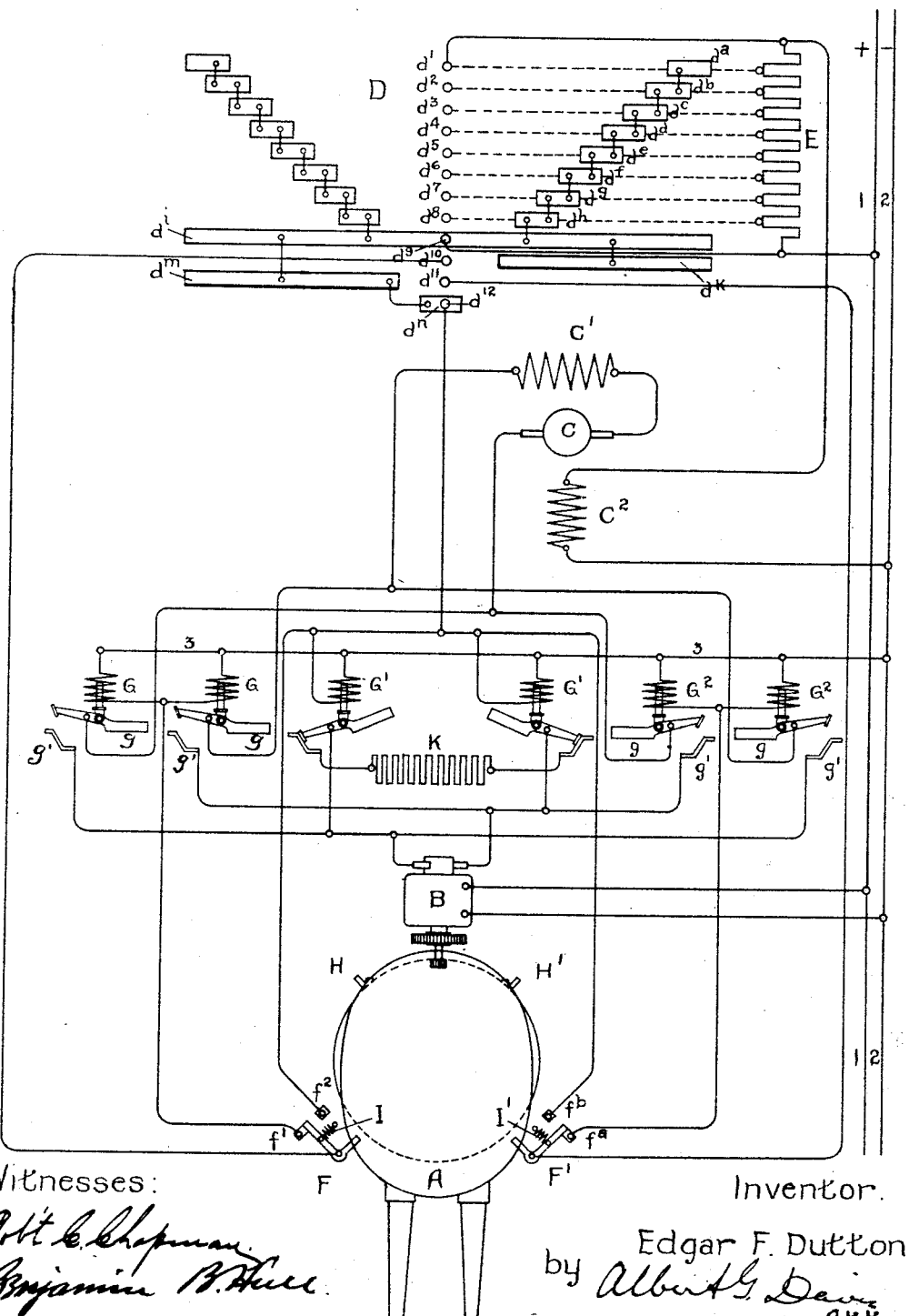
Witnesses:
Robt C. Chapman
Benjamin W. Hull
Inventor.
Edgar F. Dutton
by Albert G. Davis
Atty.
THE NORRIS PETERS CO., PHOTO-LITHO., WASHINGTON, D. C.

UNITED STATES PATENT OFFICE.

EDGAR F. DUTTON, OF SCHENECTADY, NEW YORK, ASSIGNOR TO GENERAL ELECTRIC COMPANY, A CORPORATION OF NEW YORK.

CONTROLLER FOR ELECTRIC MOTORS.

SPECIFICATION forming part of Letters Patent No. 696,017, dated March 25, 1902.

Application filed August 9, 1901. Serial No. 71,478. (No model.)

*To all whom it may concern:*

Be it known that I, EDGAR F. DUTTON, a citizen of the United States, residing at Schenectady, in the county of Schenectady, State of New York, have invented certain new and useful Improvements in Controllers for Electric Motors, (Case No. 2,240,) of which the following is a specification.

This invention relates to electric motors, and it is useful wherever a motor is employed to impart intermittent rotary or oscillatory movement to any given object, such as a turret on a warship.

The invention is an improvement upon the construction disclosed in the patent to Day, No. 644,666; and its object is to automatically stop the motor and apply the braking effect to arrest the turret or the like at a predetermined point, the brake-circuit being maintained until the controller is turned back to and beyond its central position, so as to start the motor backward to impart a like movement to the turret or the like. To effect this result, I provide the turret or other moving object with a lug or tappet, which at the predetermined limit of movement trips a switch which opens the motor-circuit and short-circuits the motor through the braking resistance. These results are preferably attained by means of intermediate electromagnetic switches or plunkers, as set forth in the Day patent aforesaid.

I shall describe my invention in its adaptation to turret control; but it will be evident that with slight modification it is equally applicable to controlling various other kinds of apparatus, such as elevators, hoists, steering-gear, and the like.

The accompanying drawing is a diagram of a turret-control system embodying my improvements.

The turret A is rotated by one or more electric motors B, suitably geared thereto, having a field separately excited from the plus and minus lighting-mains 1 and 2 and driven by current generated by a compound-wound dynamo C, having a series field C' and a separately-excited field $C^2$, connected like that of the motor across the plus and minus mains 1 2 of the electric-lighting system of the ship.

This dynamo has no other function than to supply current for the turret-actuating motor, the voltage being controlled by varying the strength of the field $C^2$. Since the speed of the motor B depends upon the voltage impressed upon its terminals, the motor will be controlled by varying the field $C^2$ of the generator. For this purpose I provide a controller D, having a plurality of stationary fingers $d'$ $d^2$ $d^3$ $d^4$ $d^5$ $d^6$ $d^7$ $d^8$, each connected with the corresponding coil of a resistance E in series with the field $C^2$. The controller-cylinder carries a set of connected segment $d^a$ $d^b$, &c., coöperating with the fingers $d'$ $d^2$, &c., and serving to cut out successive coils of the resistance E as the controller-handle is turned, the terminals of the resistance being connected with the fingers $d'$ $d^8$. A second set of similar segments provides for controlling the motor when reversed. A long segment $d^i$ extends across all the positions of the controller and is in constant contact with the finger $d^9$. Looped to this long segment are two segments $d^k$ $d^m$, each covering half the positions of the controller, one coöperating with a finger $d^{10}$ and the other with the finger $d^{11}$. A small segment $d^n$ is looped to the segment $d^m$ and rests upon a finger $d^{12}$ only when the controller is in the off position between forward and reverse. It follows that when the controller is turned for forward rotation that current will flow to the finger $d^{10}$, and when it is reversed current will flow to the finger $d^{11}$, being cut off in each case from the finger $d^{12}$.

The finger $d^{10}$ is connected through a switch F, hereinafter described, with the helices of two electromagnetic switches or "plunkers" G, said coils being in multiple and connected with a common lead 3, running to the minus lead 2. The pivoted armatures $g$ of these coils constitute switch-arms, which coöperate with the stationary contacts $g'$. The armatures are connected, respectively, with the terminals of the generator C, while the contacts $g'$ are connected, respectively, with the terminals of the motor B. Therefore when the segment $d^k$ makes contact with the finger $d^{10}$ and line-current flows through the coils G the armatures $g$ are closed upon the contacts $g'$, and the current from the dynamo C flows through the motor B, and the turret is rotated in a given direction—say clockwise in the drawing—at a speed depending on the position to which the controller is turned. If the controller has been turned in the opposite direction, so as to bring the segment $d^m$ in contact with the finger $d^{11}$, the plunkers $G^2$, with which the finger $d^{11}$ is connected through a switch F', would have operated to send the dynamo-current through the motor in the opposite direction, rotating the turret the other way.

The especial purpose of my invention is to positively limit the rotation of the turret in both directions. To this end I attach to some moving part of the turret two lugs or tappets H H', adapted to strike and operate the single-pole double-throw switches F F', connected permanently with the fingers $d^{10}$ $d^{11}$, respectively, and coöperating with contacts $f'$ $f^2$ $f^a$ $f^b$, respectively. Springs I I' hold the switches normally against the contacts $f'$ $f^a$, which are respectively in circuit with the coils G $G^2$. When the switch is moved by the tappet on the turret, it breaks this circuit and closes one through the contacts $f^2 f^b$ and the coils of the plunkers G', connected in multiple and controlling a short circuit for the armature of the motor B through a resistance K. The plunkers G' are also connected with the finger $d^{12}$, so that when the controller is in the off position the line-current will cause the armature-circuit to be closed through the resistance K, as shown in the drawing. The closing of this short circuit, either by the segment $d^n$ or either of the switches F F', causes the motor to operate as a generator driven by the turret, and thereby it acts as a brake to quickly arrest the turret. The switches F F' therefore serve to limit the movement of the turret in azimuth, and the turret remains at the end of its oscillation until the controller has been rotated backward to the reverse position, when the motor is started backward and rotates the turret similarly. As the tappet moves away from the switch the spring returns it to the contact $f'$ or $f^a$.

It is apparent that two or more motors may be used instead of one, and, in fact, on a turret two at least would be employed. For the sake of simplicity but one has been illustrated. The Day patent aforesaid shows a scheme of circuits for two motors.

What I claim as new, and desire to secure by Letters Patent of the United States, is—

1. In a motor-regulating system, the combination with a dynamo, of a motor, an object movable by said motor, and a switch located near said object and movable thereby and operating to short-circuit the motor through a resistance.

2. In a motor-regulating system, the combination with a dynamo, of a motor, an object movable by said motor, a switch adapted to be moved by said object, and two circuits controlled by said switch and operating to connect said motor for power and braking, respectively.

3. In a motor-regulating system, the combination with a dynamo, of a motor, an object movable by said motor, a switch adapted to be moved by said object, two circuits controlled by said switch, and electromagnetic switches in said circuits operating to connect said motor for power and braking, respectively.

4. In a motor-regulating system, the combination with a dynamo, of a motor, an object movable by said motor, a switch adapted to be moved by said object, two circuits adapted to be operatively connected with said motor, and means for keeping one of said circuits normally closed through said switch.

5. In a motor-regulating system, the combination with a dynamo, of a motor, an object movable by said motor, a switch adapted to be moved by said object, a spring attached to said switch, and two circuits operatively connected with said motor, one of which is kept normally closed by said switch.

6. In a motor-regulating system, the combination with a dynamo, of a motor, an object movable by said motor, a switch adapted to be moved by said object, a spring attached to said switch, a power-circuit for the motor normally closed through said switch, and a braking-circuit for the motor closed temporarily by the switch when moved by the object.

7. In a motor-regulating system, the combination with a dynamo, of a motor, an object movable by said motor, two sets of electromagnetic switches for connecting said motor with the dynamo for forward and reverse rotation respectively, a set of similar switches for short-circuiting the motor through a braking resistance, two limit-switches each normally in circuit with one set of the power-controlling electromagnetic switches, contacts for connecting said limit-switches with the braking-circuit, and tappets on the movable object for temporarily closing the limit-switches on said contacts.

In witness whereof I have hereunto set my hand this 8th day of August, 1901.

EDGAR F. DUTTON.

Witnesses:
BENJAMIN B. HULL,
CHARLES STEINER.